United States Patent

Deike

[11] Patent Number: 5,765,291
[45] Date of Patent: Jun. 16, 1998

[54] COMPRESSED-GAS SYSTEM WITH A GAS DRIER

[75] Inventor: Karl-Heinz Deike, Pattensen, Germany

[73] Assignee: WABCO GmbH, Hanover, Germany

[21] Appl. No.: 587,664

[22] Filed: Jan. 16, 1996

[30] Foreign Application Priority Data

Dec. 14, 1995 [DE] Germany ............... 195 46 719.1
Jan. 8, 1996 [DE] Germany ............... 196 00 377.6

[51] Int. Cl.$^6$ ............................................. F26B 21/06
[52] U.S. Cl. ........................... 34/80; 34/472; 34/473; 137/115.16; 137/118
[58] Field of Search ......................... 34/80, 472, 473; 251/117; 137/115.16, 115.18, 118

[56] References Cited

U.S. PATENT DOCUMENTS

| | | | |
|---|---|---|---|
| 2,374,232 | 4/1945 | Pfeiffer et al. | 34/80 |
| 3,289,694 | 12/1966 | Frye | 251/117 |
| 3,662,135 | 5/1972 | Clark | 200/148 R |
| 3,879,591 | 4/1975 | Tschanen et al. | 200/148 E |
| 4,390,037 | 6/1983 | Perkins | 137/240 |
| 4,671,925 | 6/1987 | Queiser et al. | 376/310 |
| 5,168,721 | 12/1992 | Hancock et al. | 62/292 |
| 5,186,017 | 2/1993 | Hancock et al. | 62/292 |
| 5,378,266 | 1/1995 | Elamin | |
| 5,566,556 | 10/1996 | Ekins et al. | 62/654 |
| 5,592,754 | 1/1997 | Krieder et al. | 34/527 |

FOREIGN PATENT DOCUMENTS

| | | |
|---|---|---|
| 25 20 307 B2 | 11/1975 | Germany. |
| 32 16 395 A1 | 11/1983 | Germany. |
| 36 05 391 A1 | 8/1987 | Germany. |

*Primary Examiner*—Henry A. Bennett
*Assistant Examiner*—Pamela A. Wilson
*Attorney, Agent, or Firm*—Meltzer, Lippe, Goldstein, Wolf, & Schlissel, P.C.

[57] ABSTRACT

A compressed gas system comprises a pressure generator and a consuming installation, a gas drier disposed between the pressure generator and the consuming installation, and an in-flow line connecting the pressure generator to the gas drier. Desirably, an out-flow line connects the gas drier to the consuming installation. A by-pass line also connects the pressure generator to the gas drier in parallel to the in-flow line. The by-pass line includes a pressure-controlled blocking device, such as a check valve, which allows the passage of gas from the pressure generator to the gas drier only when a predetermined opening pressure has been reached.

4 Claims, 5 Drawing Sheets

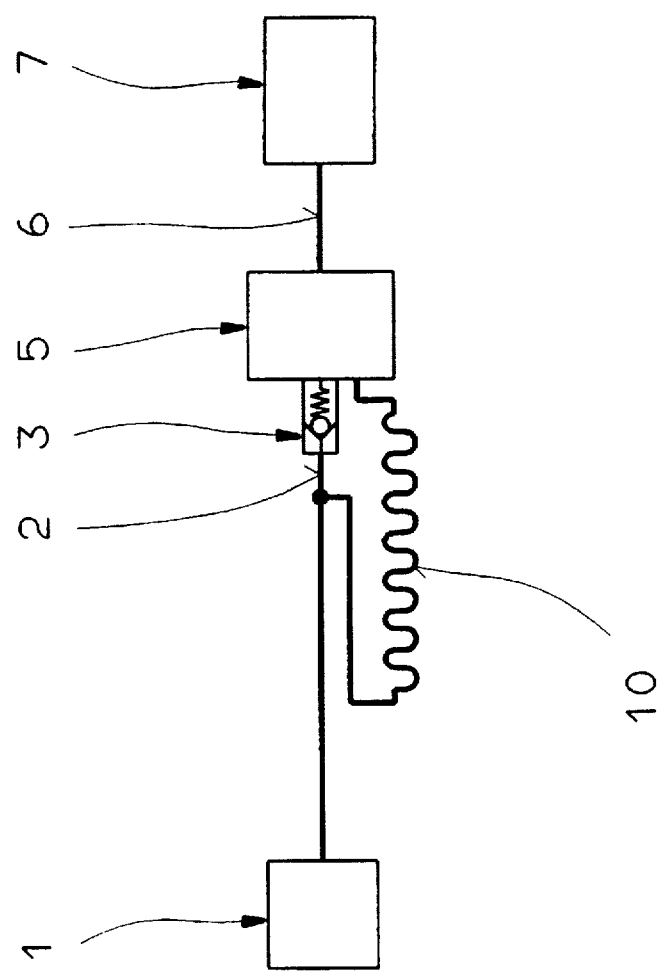

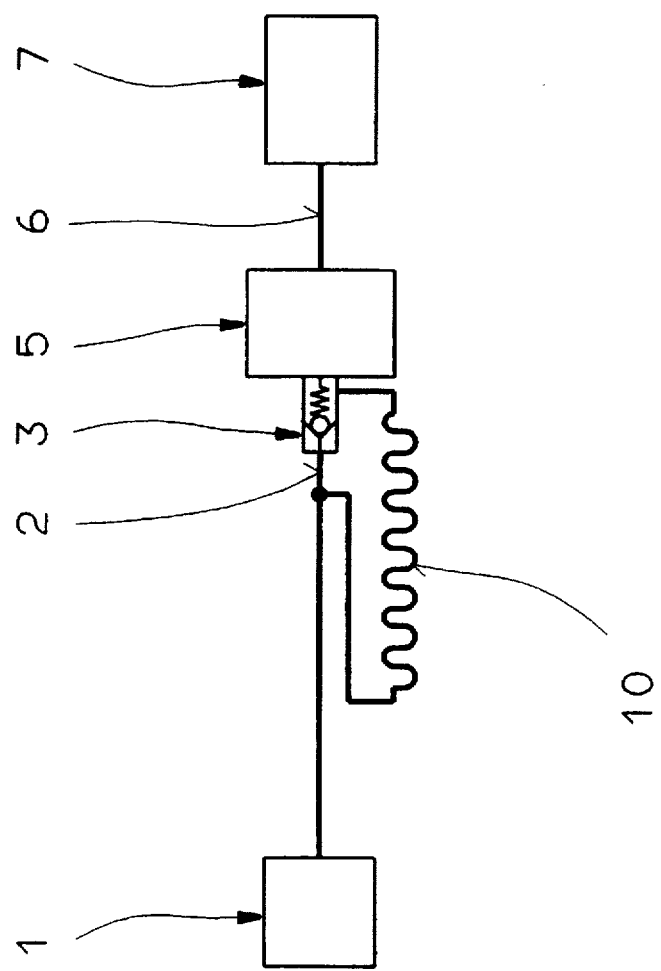

COMPRESSED-GAS SYSTEM WITH A GAS DRIER

BACKGROUND OF THE INVENTION

The present invention relates to a compressed-gas system with a gas drier disposed between a pressure generating system and a consuming installation.

A compressed-gas system using air as the gas is known from DE 32 16 395 A1. Gas compressed by the pressure-generating equipment is conveyed through an in-flow line to the gas drier, is dried therein and is then conveyed to the consuming installation which is represented there by a reserve tank.

The in-flow line may become clogged, e.g., by dirt, but also in particular by freezing when the environmental temperatures are low, as occurs in particular in the fall and in winter. This may result in a failure of the gas supply to the consuming installation and thereby also in the failure of the entire compressed-gas system.

The invention has as its object to at least reduce the danger of failure of a compressed-gas system of the type mentioned initially as a result of clogging up of the in-flow line.

SUMMARY OF THE INVENTION

This object is attained in accordance with the present invention which provides a compressed gas system comprising a pressure generator and a consuming installation, a gas drier disposed between the pressure generator and the consuming installation, and an in-flow line connecting the pressure generator to the gas drier. Desirably, an out-flow line connects the gas drier to the consuming installation. A by-pass line connects the pressure generator to the gas drier in parallel to the in-flow line. A pressure controlled blocking device, e.g., a check valve, is disposed in the by-pass line and allows the passage of gas from the pressure generator to the gas drier through the by-pass line only when a predetermined opening pressure has been reached.

The danger mentioned above occurs in particular in instances where the in-flow line contains a cooling element to cool the conveyed gas stream before it enters the gas drier. At high environmental temperatures, such as they occur especially in the spring and in summer, such cooling causes a pre-condensation of the water contained in the gas stream in the in-flow line, resulting in improved gas drying. However, this pre-condensation increases the danger of freezing of the in-flow line when surrounding temperatures are low. Such cooling is often also dependent on the admissible operating temperature of the gas drier.

Since the solution according to the invention reduces or even eliminates the existing danger of failure of the compressed-air system due to freezing of the in-flow line in case of low surrounding temperatures, the invention makes it possible to use more intensive cooling of the conveyed gas stream and thus to obtain greater pre-condensation and therefore improved gas drying. This allows for an arrangement and layout of the in-flow line and in particular of a possible cooling element in the in-flow line ensuring improved gas drying at higher surrounding temperatures, while presenting a greater danger of a freezing in-flow line at lower surrounding temperatures.

The solution according to the invention is especially effective if the by-pass line is sized and arranged so that it and the gas stream it may contain are cooled as little as possible. For this purpose, the following measures, individually or in combination with each other, are recommended:

arranging the by-pass line as short and straight as possible.

placing a possibly necessary bifurcation from the in-flow line to the by-pass line upstream of the blocking device as close as possible before the blocking device, so that the latter may be exposed as much as possible to the heat produced by the pressure generating system.

placement of the blocking device as close as possible to the pressure generating system so that heat produced by the latter may pass into the blocking device.

constructive combination of the blocking device with the gas drier.

heat insulation of the by-pass line or of the portion of the in-flow line which is upstream of the by-pass line bifurcation from the in-flow line.

The invention can be applied in all technical areas in which a consuming installation requires the supply of dry gas for the purpose of prolonged life and operational security.

The gas used in most cases is air. Compressed-air systems in automotive technology represent a significant area of application of the invention. When such an installation is used, it is recommended that the by-pass line be located as much as possible in an area which is warmed by the driving engine and/or its aggregates.

The invention is suited to gas driers of any type of construction. One example would be a gas drier operating on the adsorption principle such as described in the previously mentioned DE 32 16 395 A1, and another example would be gas driers using the condensation principle as well as those using both principles in combination.

BRIEF DESCRIPTION OF THE DRAWINGS

Additional advantages of the invention are indicated in the following description with the help of drawings of embodiments wherein:

FIGS. 3, 4 and 5 schematically show further developments of the compressed-air system according to FIG. 2.

DETAILED DESCRIPTION OF PREFERRED EMBODIMENTS

Figure 1:
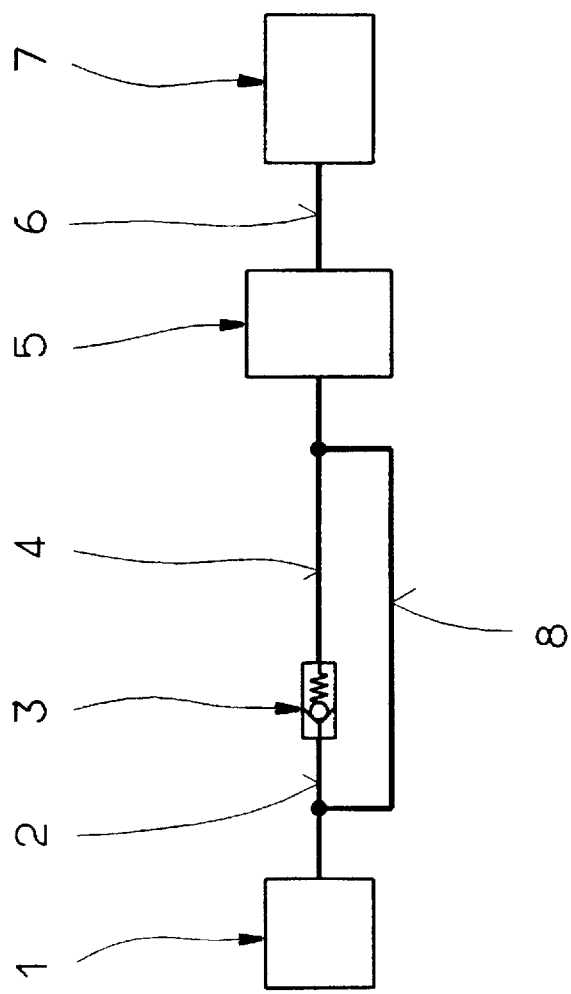
FIG. 1 schematically shows a compressed-gas system according to the invention.

The compressed-gas system shown in FIG. 1 which may be a compressed-air system in a vehicle, contains a pressure generating system, a gas drier and a consuming installation, these being designated respectively by (1), (5) and (7).

The pressure generating system (1) contains a compressor designed in any known manner and may contain additional devices such as filters, safety devices and a pressure regulator or parts thereof in the usual manner.

The gas drier (5) may be designed in any manner desired, as stated above. The gas drier (5) may also comprise additional devices, e.g. a regeneration container and, as the one according to the previously mentioned DE 32 16 395, a compression regulator or parts thereof.

The consuming installation (7) contains gas consumers, such as working and/or brake cylinders, safety devices ensuring emergency operation in case of failure of the pressure in-flow or of part of the consuming installation, as well as control and regulating devices. The consuming installation may also contain the pressure regulator or parts thereof. As a rule, the consuming installation is designed with several circuits to ensure the above-mentioned emergency operation.

While the output of the gas drier (5) is connected to the consuming installation (7) via an outflow line (6), the input of the gas drier (5) is connected to the output of the pressure generating system (1) via an in-flow line (8) and via a by-pass line (2, 3, 4) which is parallel to it. The by-pass line (2, 3, 4) contains a blocking device (3). The input of the blocking device (3) is connected to the pressure generating system (1) while the output of the blocking device (3) is connected to the gas drier (5).

The blocking device (3) is made so that it allows the flow from the pressure generating system (1) to the gas drier (5) to go through when a predetermined opening pressure (po) has been reached and blocks below the opening pressure (po). For this purpose the blocking device (3) is controlled by the pressure appearing at its input and/or by the difference between the pressures appearing at its input and at its output. Any type of device with the characteristics mentioned above is suitable to be used as the blocking device. Check valves with predetermined opening pressure, overflow valves and pressure-controlled or pressure differential-controlled directional valves shall be mentioned only as examples as being suitable valves.

The blocking device (3) in the illustrated embodiment is a check valve. This offers a very simple and low-cost solution.

The check valve is given hereinafter the reference number (3) of the blocking device.

The check valve (3) is placed so that its flow-through direction is oriented from the pressure generating system (1) to the gas drier (5). The check valve (3) is designed so that when atmospheric pressure appears at its output, its input allows flow-through when a predetermined opening pressure (po) occurs at its input. This characteristic can be produced e.g. by appropriate configuration and/or setting of a return spring which prestresses a closing element of the check valve (3).

During the operation of the pressure installation, operation under load and idling of the pressure generating system (1) occur, as well as a normal state and an exceptional state. In operation under load, the pressure generating system (1) conveys in the normal state the gas it has compressed through the in-flow line (8) to the gas drier (5). The gas flow is dried in the latter and then conveyed through the out-flow line (6) to the consuming installation (7). When the pressure in the consuming installation (7) has reached a predetermined nominal value, the pressure regulator switches the pressure generating system (1) to idle and thus interrupts its conveying of gas. The pressure regulator is able to effect this switch-over by acting upon the suction side of the pressure generating system (1) and/or by interrupting the connection between the pressure generating system (1) and the consuming installation (7). During idling of the pressure generating system (1), the water accumulated in the gas drier (5) is blown out of the latter. At the same time, if the gas drier (5) works on the adsorption principle, the adsorption medium is regenerated by a back-flow from the consuming installation (7) or the above-mentioned regeneration container.

The output pressure of the pressure generating system (1) appears essentially at the input of the check valve (3), and the input pressure of the gas drier (5) appears essentially at the output of the check valve (3). The latter pressure is lower than the first-mentioned pressure by the pressure loss in the in-flow line (8). The difference between the two pressures is also variable in case the quantity conveyed by the pressure generating system (1) is variable. In order to ensure that the conveying of the pressure generating system (1) is exclusively through the in-flow line (8) in normal operation, the opening pressure (po) of the check valve (3) must be calculated and set to the value of the highest occurring pressure difference between input and output of the check valve (3) in operation under load of the pressure generating system (1).

The previously mentioned exceptional state occurs when the in-flow line (8) is clogged up, e.g. freezes. In this case the consuming installation can no longer be supplied through the in-flow line (8). Without the by-pass line (2, 3, 4) the compressed-gas system would fail completely in such case.

In the exceptional state, however, the check valve (3) opens when the opening pressure (po) has built up at its input, so that the gas stream is able to reach the gas drier (5) and from there the consuming installation (7) through the by-pass line (2, 3, 4) instead of the in-flow line (8). The compressed-gas system then works by means of the by-pass line (2,3,4), e.g., as by means of the in-flow line (8).

Concerning the placement of the by-pass line (2, 3, 4) and of the check valve (3) and to avoid repetition, the previously mentioned recommendations are referred to.

It should also be mentioned that in the by-pass line (2, 3, 4) there often occurs less pre-condensation of the water contained in the gas stream than in the in-flow line (8) so that gas drying quality is thereby reduced. This effect occurs in particular in placements of the by-pass line (2, 3, 4) according to the previously mentioned recommendations. However, since the exceptional case is caused generally by freezing of the in-flow line (8) and since the water content of the gas is lower at the then prevailing low surrounding temperatures, the reduced pre-condensation has practically no effect.

The above explanations concerning the check valve (3) apply also to other embodiments of the blocking device in corresponding manner.

The by-pass line (2, 3, 4) is especially effective in compressed-gas systems in which no gas stream passes through the in-flow line (8) in idling operation.

Figure 2:
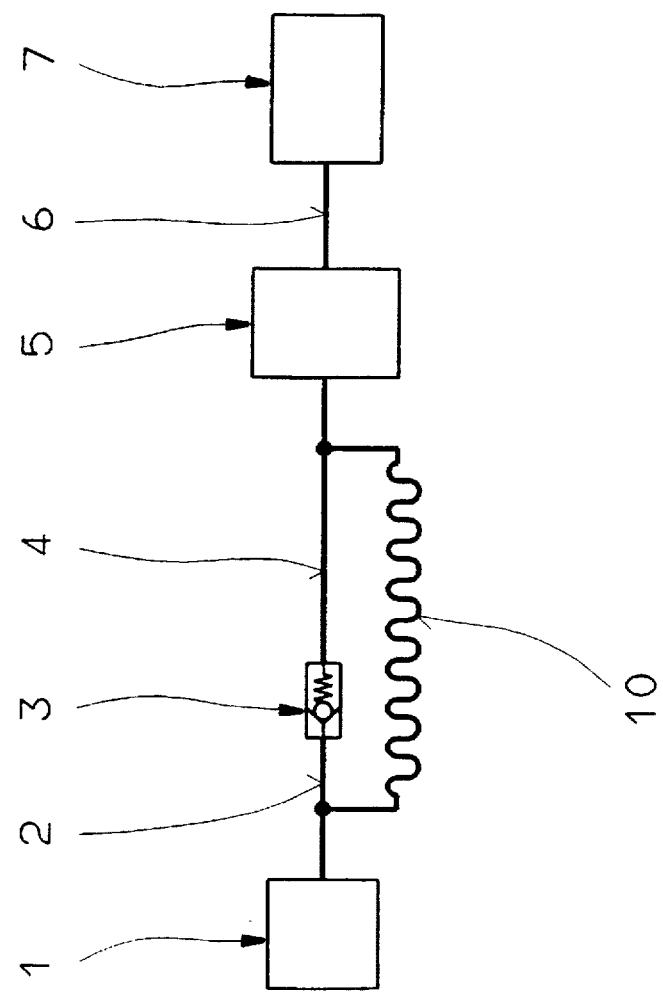
FIG. 2 schematically shows a further development of the compressed-gas system according to FIG. 1.

FIG. 2 shows a further development of the compressed-gas installation according to FIG. 1, in which the in-flow line (10) contains a cooling element to cool the gas stream before it enters the gas drier. According to the drawing, the cooling element is created by laying the in-flow line (10) in curves so that its surface is enlarged. Another commonly used method in producing the cooling element is the laying of the in-flow line (10) in the manner of coils. The cooling element may however be produced by any other method, e.g. by means of a pipe heat exchanger.

In FIGS. 1 and 2 the by-pass line (2, 3, 4) and the in-flow line (8 or 10) converge downstream of the blocking device (3). The common portion of the two lines which is thus created directly before the input of the gas drier (5) may become clogged as much as the in-flow line (8 or 10) unless appropriate countermeasures are taken (e.g. heat insulation), with the risk of complete failure of the compressed-gas system.

Figure 3:
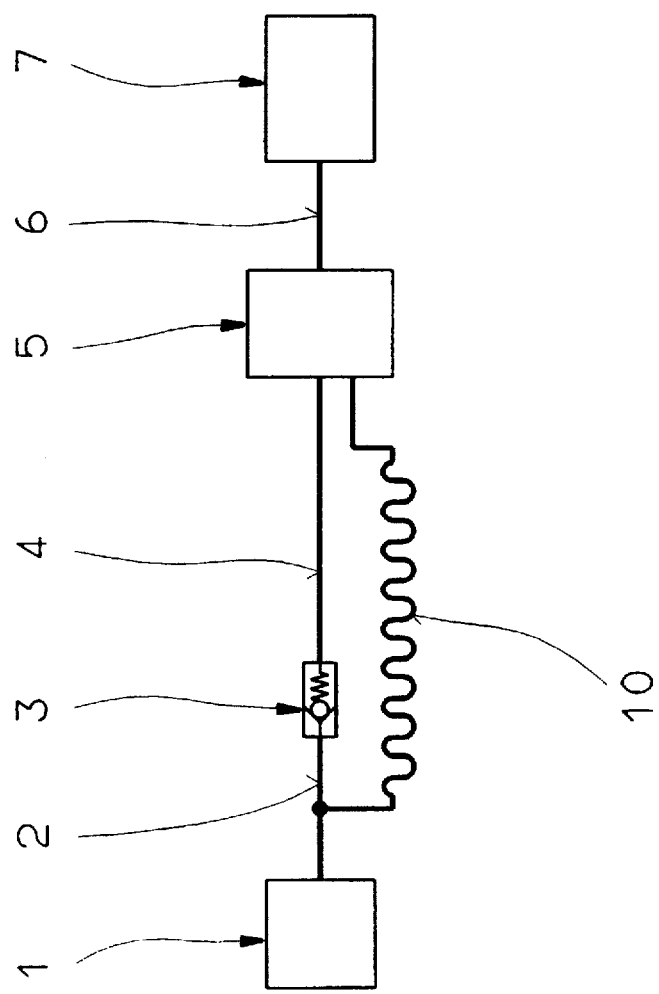

FIGS. 3 to 5 show further developments of the compressed-gas system according to FIG. 2 which eliminate this danger.

In FIG. 3 the in-flow line (10) and the by-pass line (2, 3, 4) extend downstream of the blocking device (3) without a common line portion to separate inputs of the gas drier (5).

In FIG. 4 the blocking device (3) is structurally combined with the gas drier (5) so that the by-pass line which in this case is to be designated (2, 3) has no line portion at all downstream of the blocking device (3). The structural combination of the blocking device (3) with the gas drier (5) can be implemented as shown in such manner that it is added to the gas drier (5) in a suitable manner as an independent device, e.g. by screw connection or with a flange as an independent device. The structural combination can however also be made so that components which are not independent but assure the functioning of the blocking device are completely integrated.

Furthermore the bifurcation point between in-flow line (10) and by-pass line (2, 3) upstream of the blocking device (3) is moved optically close to said blocking device (3) so that the latter may be subjected to the heat which is carried by the gas stream and through heat conductivity in the line portion lying upstream of the bifurcation.

FIG. 5 is the same as FIG. 4, with the difference that the in-flow line (10) lets out into the blocking device (3) behind the latter's blocking element. This solution does not require a second input of the gas drier (5).

In all other respects the explanations given for one embodiments apply to the other embodiment directly or correspondingly.

The person schooled in the art will recognize that the examples of embodiments do not exhaust the area of protection of the invention, but that this area of protection covers all embodiments with the characteristics mentioned in the claims.

I claim:

1. Compressed gas system comprising
   a pressure generator and a consuming installation,
   a gas drier disposed between said pressure generator and said consuming installation,
   an in-flow line connecting said pressure generator to said gas drier, and a by-pass line having a pressure-controlled blocking device disposed therein which allows the passage of gas from said pressure generator to said gas drier through said by-pass line when a predetermined opening pressure has been reached.

2. The compressed gas system of claim 1, wherein said blocking device comprises a check valve which is set to open at said predetermined opening pressure.

3. The compressed gas system of claim 1, wherein said blocking device is mounted on said gas drier.

4. The compressed gas system of claim 1 further comprising an out-flow line connecting said gas drier to said consuming installation.

* * * * *